United States Patent
Hutzelmann et al.

(10) Patent No.: US 9,194,506 B2
(45) Date of Patent: Nov. 24, 2015

(54) CENTRAL VALVE FOR PIVOT MOTOR ACTUATOR

(71) Applicant: Hilite Germany GmbH, Marktheidenfeld (DE)

(72) Inventors: Stefanie Hutzelmann, Graefendorf (DE); Jan Kroepelin, Seelze (DE); Dietmar Schulze, Muenzenberg (DE)

(73) Assignee: Hilite Germany GmbH, Marktheidenfeld (DE)

( * ) Notice: Subject to any disclaimer, the term of this patent is extended or adjusted under 35 U.S.C. 154(b) by 118 days.

(21) Appl. No.: 14/256,259

(22) Filed: Apr. 18, 2014

(65) Prior Publication Data

US 2014/0311594 A1    Oct. 23, 2014

(30) Foreign Application Priority Data

Apr. 22, 2013 (DE) .......................... 10 2013 104 031
Apr. 22, 2013 (DE) .......................... 10 2013 104 051

(51) Int. Cl.
*F16K 11/07* (2006.01)
*F16K 31/06* (2006.01)
*F16K 17/10* (2006.01)
*F01L 1/344* (2006.01)

(52) U.S. Cl.
CPC ............... *F16K 17/105* (2013.01); *F01L 1/344* (2013.01); *F01L 1/3442* (2013.01); *F01L 2001/3443* (2013.01); *F01L 2001/34433* (2013.01); *F01L 2001/34469* (2013.01); *F01L 2001/34483* (2013.01); *Y10T 137/7765* (2015.04)

(58) Field of Classification Search
CPC ............... F01L 2001/3443; F01L 2001/34433; F16K 17/105; F16K 31/0613; Y10T 137/7767
USPC ............. 137/625.25, 625.48, 625.68, 625.69, 137/599.16, 599.17
See application file for complete search history.

(56) References Cited

U.S. PATENT DOCUMENTS

| 3,652,039 | A  | * | 3/1972 | Lucien ................... B64C 25/16 137/625.69 |
| 5,046,460 | A  | * | 9/1991 | Butterfield .......... F01L 1/34409 123/90.15 |
| 6,557,823 | B2 | * | 5/2003 | Sakai .................. F15B 13/0402 251/129.01 |
| 7,987,827 | B2 | * | 8/2011 | Fujiyoshi ................ F01L 1/022 123/90.12 |
| 8,382,064 | B2 | * | 2/2013 | Nisinosono ......... F16K 31/0613 251/129.15 |
| 8,636,483 | B2 | * | 1/2014 | Shimizu ................ F04B 49/007 417/206 |
| 8,662,040 | B2 | * | 3/2014 | Knecht .................. F01L 1/3422 123/90.15 |
| 2009/0178635 | A1 | * | 7/2009 | Takenaka .............. F01L 1/3442 123/90.17 |
| 2012/0152195 | A1 | * | 6/2012 | Schulze ............. F01L 1/34409 123/90.17 |

FOREIGN PATENT DOCUMENTS

| DE | 10 2006 012 775 | | 9/2007 |
| DE | 10 2010 061 337 A1 | | 6/2012 |
| EP | 1 596 039 B1 | | 11/2005 |
| EP | 2 375 014 A1 | | 10/2011 |

* cited by examiner

*Primary Examiner* — Marina Tietjen
*Assistant Examiner* — Seth W Mackay-Smith
(74) *Attorney, Agent, or Firm* — Von Rohrscheidt Patents

(57) ABSTRACT

The invention relates to a central valve for a pivot motor actuator. A housing tube of the central valve includes radial recesses for operating connections. A piston of the central valve has a center position. In the center position both radial recesses are covered by annular bars of the piston towards the tank drain connection by overlaps. Thus, pressure spikes from the operating connections to the check valves are strongly throttled.

8 Claims, 6 Drawing Sheets

CENTRAL VALVE FOR PIVOT MOTOR ACTUATOR

RELATED APPLICATIONS

This application claims priority from German patent application DE 10 2013 104 051.9 filed on Apr. 22, 2013 and German patent application DE 10 2013 104 031.4 filed on Apr. 22, 2013, both of which are incorporated in their entirety by this reference.

FIELD OF THE INVENTION

The invention relates to a central valve according to one piece claim 1.

A central valve of this type is part of a pivot motor actuator system which includes a rotor which is adjustable through a hydraulic pressure at one of its two operating connections respectively in one of its two rotating directions.

It is an ongoing development goal for pivot motor actuation systems on the one hand side to have a minimum load on a hydraulic pump since this hydraulic pump typically has to supply all consumers in a vehicle. Another development goal is quick adjustability. In order to better comply with these contradicting requirements it is known to use pressure peaks during cam shaft adjustment through check valves.

In the pivot motor actuation system that is known from DE 10 2006 012 775 A1 pressure chambers of the rotor are provided with check valves so that pressure spikes that occur during quick adjustment are being utilized. Thus, a portion of the hydraulic fluid from the pressure cavities associated with one rotating direction is supplied to a flow from the oil pump so that a greater volume flow is provided for the other pressure cavities.

It is known from EP 2 375 014 A1 to integrate check valves into the central valve in order to use cam shaft adjustment torques in that band check valves are arranged at an inside of a housing tube. At both operating connections and at the supply connection of the housing tube a respective band check valve presses from an inside against the housing tube. When sufficient pressure is supplied to the respective connection the band check valve opens so that hydraulic fluid flowing into the central valve at one operating connection can be supplied to the other operating connection together with hydraulic fluid from the supply connection. Starting from a central position of the central valve initially a switching position is proportionally controllable in which pressure spikes of the operating connection to be unloaded are blocked relative to the operating connection to be loaded. Thereafter another switching position is controllable in order to use the cam shaft adjustment torques.

From DE 10 2010 061 337 A1 a valve for a pivot motor actuator is known in which each operating connection A or B is divided into an operating connection A* or B* for using cam adjustment torques and an operating connection A or B for directly passing hydraulic fluid to the pressure cavities of the torque motor actuator. The operating connections A* and B* for using cam adjustment torques include check valves. In a center position of the piston both operating connections A* and B* are blocked through a common annular bar. The blocking of the annular bar in the center position improves control quality in the center position.

EP 1 596 039 B1 relates to a valve for using cam adjustment torques, thus check valves are provided in annular bars of a hollow piston. The adjustment is provided exclusively through cam adjustment torques. A tank drain connection is not provided.

BRIEF SUMMARY OF THE INVENTION

Thus, it is an object of the present invention to improve control quality in a center position for a pivot motor actuator with an axially short central valve. The object is achieved through a central valve for a pivot motor actuator, the central valve including a housing tube including a first operating connection, a supply connection, a second operating connection and a tank drain connection, wherein a respective radial recess is associated with each of the two operating connections, wherein the respective radial recess is coverable by a respective annular bar of a piston that is arranged within the housing tube and axially moveable relative to the housing tube, wherein the first operating connection is connected with the supply connection in a first position of the piston in that a first annular bar opens a first radial recess towards the supply connection, wherein the second operating connection is opened by a second annular bar towards the tank drain connection in the first position of the piston, wherein the piston is in a center position in a second position of the piston, wherein the second operating connection is connected with the supply connection in a third position of the piston in that the second annular bar opens the second radial recess towards the supply connection, wherein the first operating connection is opened by the first annular bar towards the tank drain connection in the third position of the piston, wherein the piston includes at least one first check valve on its outside wherein the at least one first check valve opens a flow path from the first operating connection to the second operating connection when the piston is in the third position and a pressure is provided at the first operating connection that exceeds a first threshold value and the piston includes at least one second check valve on its outside wherein the at least one second check valve opens a flow path from the second operating connection to the first operating connection when the piston is in the first position and a pressure is provided at the second operating connection which exceeds a second threshold value, wherein both radial recesses are covered by the annular bars towards the tank drain connection by overlaps in the center position of the piston, so that pressure spikes above the threshold values from the operating connections to the check valves are highly throttled. Advantageous embodiments of the invention are provided in the dependent claims.

In a central valve according to the invention a first operating connection is connected with the supply connection and a second operating connection is connected with the tank drain connection in a first position of the piston. In a second position, this means a center position of the piston, the first operating connection and the second operating connection are cut off besides leakage flows. In a third position of the piston the second operating connection is connected with the supply connection and the first operating connection is connected with the tank drain connection. Thus, each operating connection can be connected the tank drain connection. A single tank drain connection suffices. Tank drain connections can also be provided on both sides of the central valve. A tank drain connection in the portion of the engine housing exit is particularly advantageous when the pivot motor actuator is a chain actuator with a chain that needs to be lubricated. Timing belt adjustors, however, have to be kept free from hydraulic fluid, in particular oil.

In a central valve according to the invention the piston includes plural check valves on an outside of the piston.

A first check valve provides hydraulic fluid from the first operating connection to the hydraulic flow from the supply connection. At this location, an increased volume flow is therefore provided from the supply connection to the second operating connection when a pressure is provided to the first operating connection, which pressure exceeds a threshold value and the piston is in its third position.

The situation is analogous at the second check valve. The second check valve runs hydraulic fluid from the first operating connection to the hydraulic flow from the supply connection. At this location an increased volume flow is therefore provided from the supply connection for the first operating connection when a pressure is provided at the second operating connection, which pressure exceeds a threshold value and the piston is in its first position.

Thus, the check valves facilitate using cam adjustment torques. Hydraulic fluid which flows from an operating connection in a direction to a tank drain connection T is supplied to the other operating connection to be supplied with hydraulic fluid. Thus, a quick adjustment of the pivot motor actuator can be combined with a small loading of the hydraulic pump of the system. Since the check valves are arranged externally on the piston, a flow path can extend respectively from one of the two operating connections to the tank drain connection T. No splitting of the operating connections A, B is required. This means contrary to DE 10 2006 012 775 A1 it is not required that each operating connection is divided into a bore hole for direct pass through to the cavity and a check valve bore hole for using cam adjustment torques. When one of the check valves of a central valve according to the invention is open hydraulic fluid flows between the outside of the piston and the inside of the housing tube from one of the two operating connections into the hydraulic fluid flow coming from the supply connection P.

In a particularly advantageous manner the central valve according to the invention does not require any axial installation space for separate operating connections A* and B* for using cam adjustment torques. Thus, the piston is axially moveable within the housing tube. The housing tube includes radial recesses. The radial recesses are associated with the operating connections A and B. In the center position the two radial recesses are covered by the annular bars towards the tank drain connection T with overlaps. Thus, pressure spikes above the threshold values from the operating connections A, B to the check valves are strongly throttled by leakage gaps. The hydraulic fluid does not flow through the check valves but it flows to the tank drain connection T. In the center position there are no interferences between the check valves so that there are no problems with respect to control quality.

An advantageous embodiment provides that plural check valves are associated with each of the operating connections A and B on an outside of the piston. When sufficient pressure is provided to the operating connection plural check valves can advantageously let a larger amount of hydraulic fluid pass through so that pressure spikes can be used even better. Plural first check valves and plural second check valves can be arranged for example distributed in a circumferential direction about the piston.

Another advantageous embodiment provides that the first check valves are arranged in a sleeve in which the piston is arranged. The second check valves can be arranged in the same sleeve or in another sleeve in which the piston is inserted. This way the central valve can be assembled in a simple manner, namely in that one or plural sleeves are slid onto the piston so that the check valves are externally attached at the piston. Arranging first and second check valves in different sleeves has the advantage that the same component can be slid onto the piston in different orientations in order to attach first and second check valves at the piston.

The piston can be configured as a hollow piston in a particularly advantageous embodiment. In this case an interior of the piston can be used without problems to provide a flow path from one respective operating connection of the two operating connections to the tank drain connection T. Additionally openings of the housing tube which form the operating connections can be flowed through by hydraulic fluid in both directions. Contrary to EP 2 375 014A1 not every operating connection has to be divided into a bore hole for direct pass through to the cavity and a check valve bore hole for using the cam adjustment torques.

BRIEF DESCRIPTION OF THE DRAWINGS

Additional features and advantages of the invention are described based on embodiments with reference to appended drawing figures, wherein identical and equivalent components are designated with identical reference numerals, wherein.

DETAILED DESCRIPTION OF THE INVENTION

Figure 1:
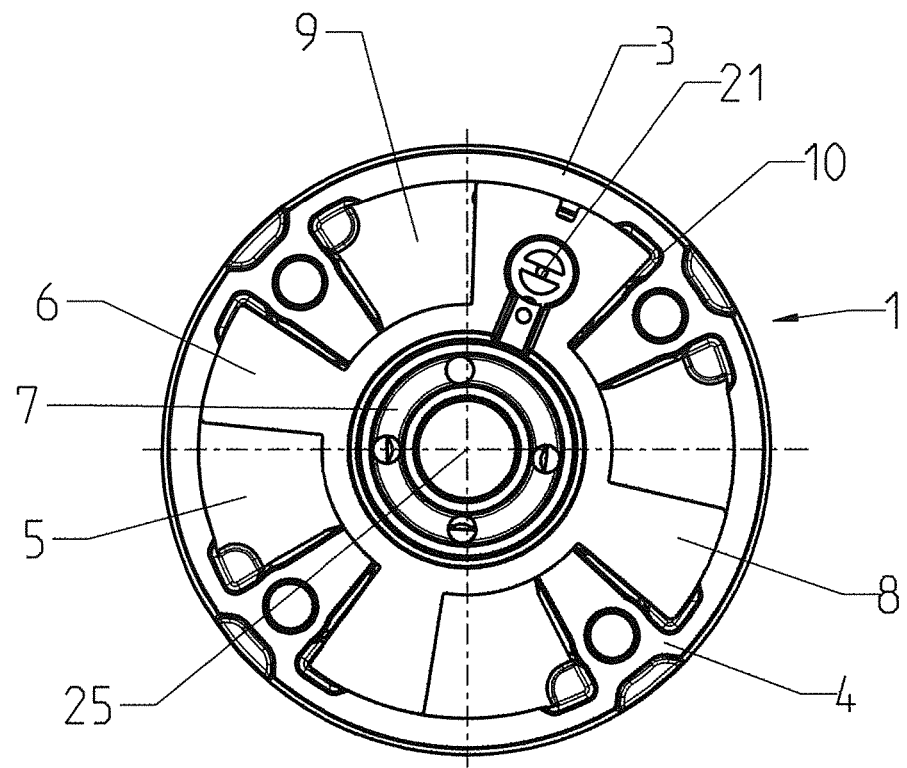
FIG. 1 illustrates a pivot motor actuator without associated central valve in a sectional view.

A pivot motor actuator is used to change an angular position of a cam shaft during operation of an internal combustion engine. By rotating the cam shaft opening and closing times of the gas control valves are moved so that the internal combustion engine delivers optimum power at a respective speed. The pivot motor actuator thus facilitates continuous adjustment of the cam shaft. The pivot motor actuator has a cylindrical stator 1 which is connected torque proof with a gear that is evident from FIG. 2. In the embodiment the gear 2 is a sprocket over which a chain is run that is not illustrated in detail. The gear 2, however, can also be a timing belt cog over which a drive belt is run as a drive element. The stator 1 is in a driving connection with the crank shaft through the drive element and the gear 2 in a known manner.

The stator 1 and the gear 2 can alternatively also be integrally configured in one piece when the other side of the stator 1 can be opened. Thus, the stator 1 and the gear 2 can be made from a metal material and/or a hard plastic material. For a metal material among others sinter metals, steel plates and aluminum can be used. The stator 1 includes a cylindrical stator base element 3 at who's inside radially inward protruding bars 4 extend with uniform spacing between one another. Pressure cavities 5 are formed between adjacent bars 4 into which pressure medium is introduced in a controlled manner through a central valve 100 illustrated in FIG. 3 and FIG. 4. Between adjacent bars 4, wings 6 extend which protrude radially outward from a cylindrical rotor base element 7 of a rotor 8. The wings 6 subdivide the pressure cavities 5 between the bars 4 respectively into the two pressure cavities 9 and 10.

The bars 4 contact an outer enveloping surface of the rotor base element 7 with their faces in a sealing manner. The wings 6 in turn contact a cylindrical inner wall of the stator base element 3 with their faces in a sealing manner.

The rotor 8 is connected torque proof with the cam shaft that is not illustrated in more detail. In order to change an angular position of the cam shaft the rotor 8 is rotated relative to the stator 1. For this purpose the pressure medium in the pressure cavities 9 or 10 is pressurized based on the desired direction of rotation, whereas the respective other pressure cavities 10 or 9 are relieved towards the tank.

Figure 2:
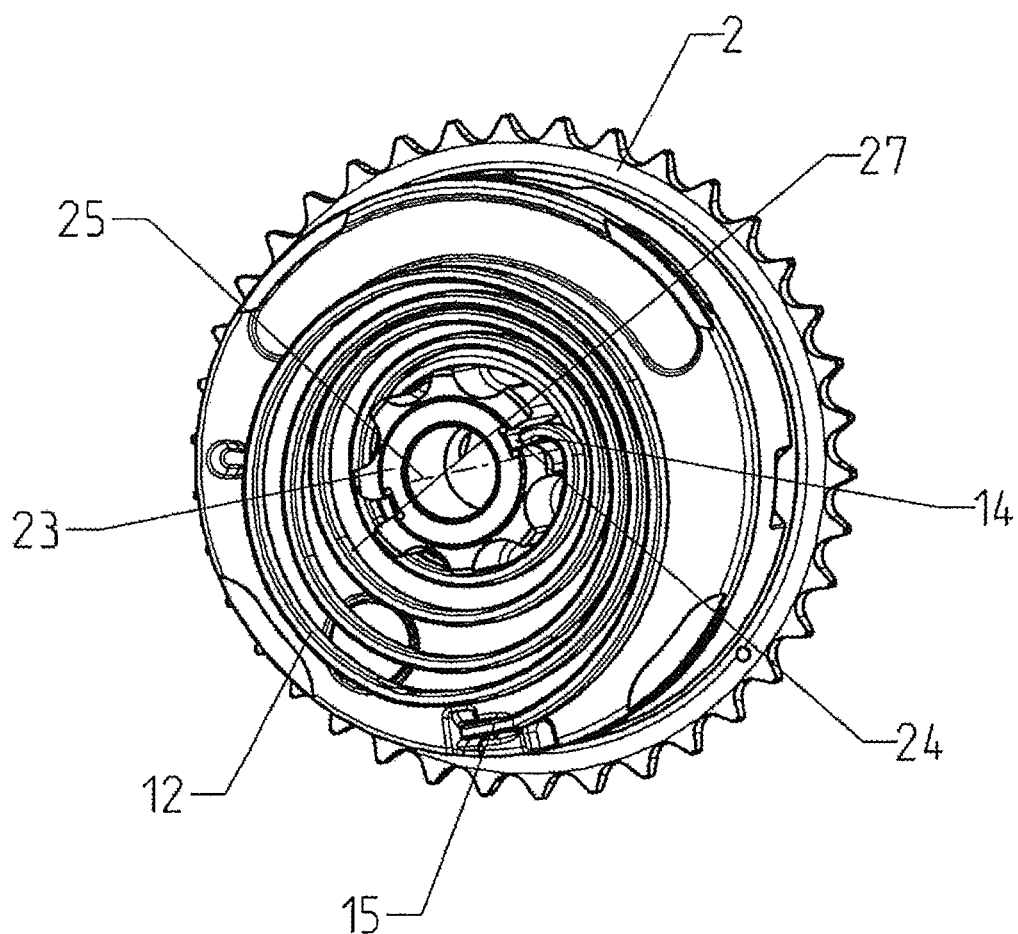
FIG. 2 illustrates the pivot motor actuator of FIG. 1 in a perspective view from outside.

According to FIG. 2 the pivot motor actuator includes a spiral spring 12 through which the rotor 8 is preloaded in a direction of rotation relative to the stator 1 in order to compensate a friction torque at the crank shaft. The spiral spring 12 includes plural windings 27. The spiral spring 12 is received torque proof with its inner end 14 in one recess 24 at a hub 23 of the rotor 8. The spiral spring 12 is connected torque proof at the stator 1 with an outer end 15 of the spiral spring. A central bore hole 25 is provided within the hub 23 into which bore hole a central valve 100 is inserted and threaded together with the cam shaft.

Figure 3:
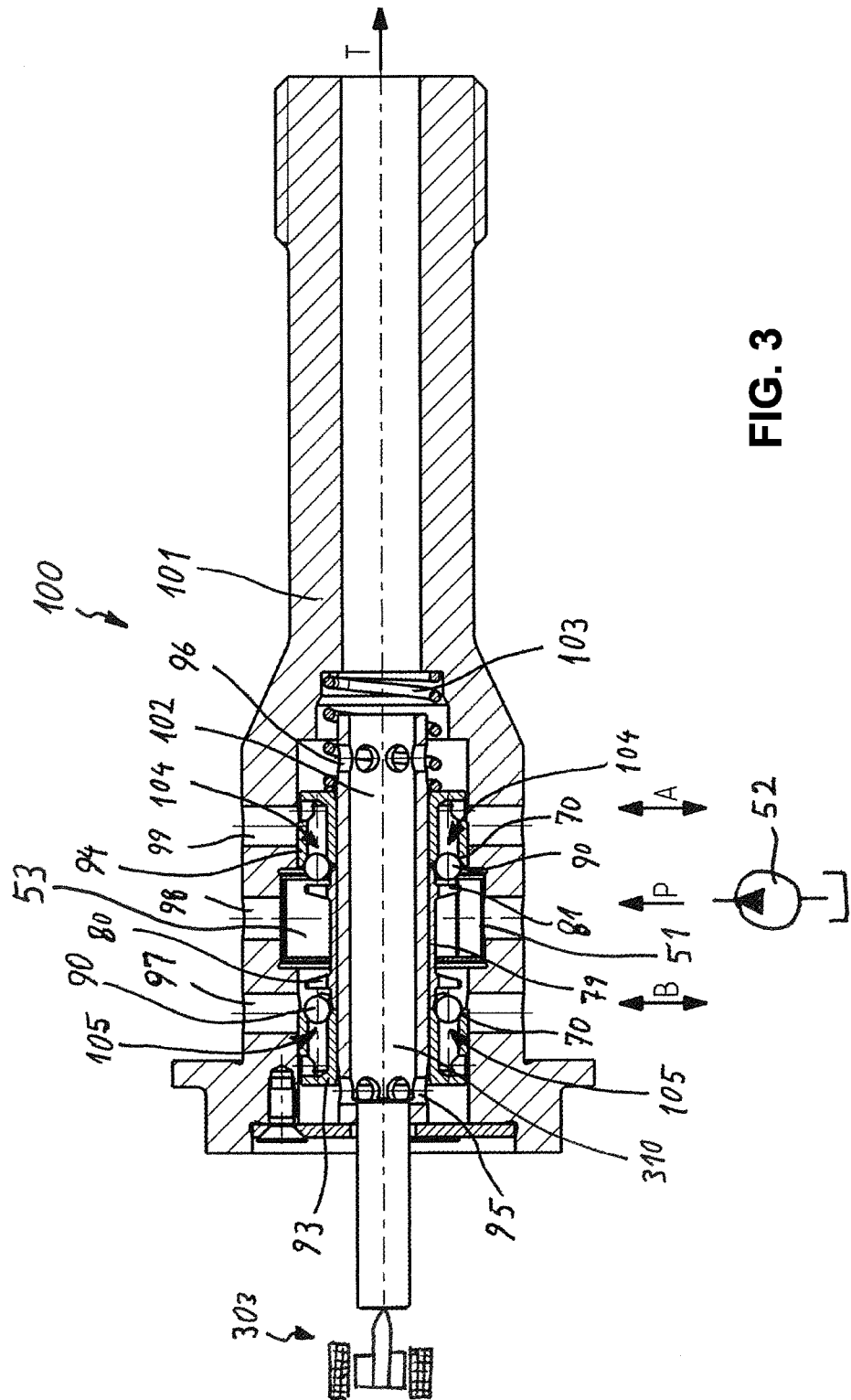
FIG. 3 illustrates a longitudinal sectional view of a first embodiment of a central valve for a pivot motor actuator according to FIGS. 1 and 2.

FIG. 3 illustrates the central valve 100 for the pivot motor actuator in a longitudinal sectional view. The central valve 100 has a housing tube 101 which includes radial recesses 97, 98, 99 arranged at a distance from one another which form a first operating connection A, a supply connection P, and a second operating connection B. The supply connection P is preferably arranged between both operating connections A, B. In the illustrated embodiment the housing tube 101 has a tank drain connection T at a face. The tank drain connection T, however, can also be configured as a radial connection. In the illustrated embodiment the housing tube 101 only has three radial connections, namely two operating connection A and B and a supply connection P. Therefore all radial recesses 97, 98, 99 of the housing tube 101 have one of three distances from a first end of the housing tube 101. Separate operating connections for using cam adjustment torques are not provided.

A hollow piston 102 is arranged in the housing tube 101 wherein the hollow piston is moveable in a longitudinal direction relative to the housing tube 101 against a reset force of a reset spring 103 and includes radial openings 95, 96. In a first position of the hollow piston 102 that is not illustrated the first operating connection A is connected with the supply connection P and simultaneously the second operating connection B is connected with the tank drain connection T. On the other hand side in a second position of the hollow piston 102 the first operating connection A and the second operating connection B are blocked. This blocking, however, comes with minor leakage losses. This second position is the center position illustrated in FIG. 5. In a third position of the hollow piston that is illustrated in FIG. 3 the second operating position B is connected with the supply connection P and the first operating connection A is simultaneously connected with the tank drain connection T.

Downstream of the supply connection P a pump check valve 51 is arranged. The pump check valve 51 is followed downstream by an inner cavity 53. The inner cavity 53 is arranged in the flow path between the two operating connections A, B.

The hollow piston 102 has plural check valves 104, 105 on its outside. One half of the check valves which are subsequently designated as first check valves 104 open a connection between the first operating connection A and the inner cavity 53 which is supplied with hydraulic fluid from the supply connection P or the oil pump 52. Thus, hydraulic fluid can flow through the inner cavity 53 also between the two operating connections A, B when the hollow piston 102 is in its third position and a pressure is supplied to the operating connection A which exceeds a threshold value. The other half of the check valves which are subsequently designated as second check valves 105 open a connection between the second operating connection B and the supply connection P. Thus, hydraulic fluid can flow through the supply connection P also between the two operating connections A, B when the hollow piston 102 is in its first position and a pressure is provided to the second operating connection B which pressure exceeds a threshold value. When the piston 102 is in its first or in its third position the check valves 104, 105 can open a flow path in which hydraulic fluid flows between an outside of the hollow piston 102 and an inside of the housing tube 101 from one of the two operating connections A or B to the interior cavity 53. Thus, the hydraulic fluid is provided to the other operating connection B or A when there is an increased volume flow requirement.

In a pivot motor actuator system in order to adjust the rotor 8 its first pressure cavities 9 are connected through one of the two operating connections A or B with the supply connection P, while second pressure cavities of the rotor 8 are simultaneously connected through the other operating connection B or A with the tank drain connection T. During rotor adjustment a hydraulic pressure is provided to the operating connection that is connected with the tank drain connection T. This hydraulic pressure is the greater, the quicker the adjustment is performed. The check valves 104, 105 of the illustrated central valve 100 open when the pressure exceeds a threshold value and thus facilitate using the pressure spikes. Therefore the central valve 100 facilitates quicker adjustment with lower loading of the hydraulic pump of the pivot motor actuator system.

The first check valves 104 can be arranged in a sleeve 94 which is attached at the hollow piston 102. The reset spring 103 can be supported with one end at the sleeve 94. The other end of the reset spring 103 can be supported at an inner surface of the housing tube 101. The sleeve 94 can close the radial recess 99 in the second position of the hollow piston 102 so that the hydraulic flow from and to the first operating connection A is blocked besides a leakage flow.

The sleeve 94 can be pressed for example onto the hollow piston 102. Another option for a rigid connection between the sleeve 94 and the hollow piston 102 is a welded connection. The second check valves 105 can be arranged in the same sleeve 94 or in a second sleeve 93 which is also slid onto the hollow piston 102.

The sleeve 93 with the second check valves 104 can close the radial recess 97 in the second position of the hollow piston 102 so that the hydraulic flow from and to the second operating connection B is blocked besides a leakage flow.

The check valves 104, 105 can for example be ball valves, thus can have a closing element 90 that is shaped as a ball. The closing elements 90 of the first and second check valves 104, 105 are respectively moveable in a longitudinal direction of the hollow piston 102 relative to the hollow piston 102. Thus, the first check valves 104 and the second check valves 105 are oriented opposite to one another.

The radial openings 95, 96 of the hollow piston 102 through which the hydraulic fluid can pass are respectively arranged in an end section of the hollow piston 102. The first check valves 104 and the second check valves 105 are attached at an outside of a center section of the hollow piston 102 which center section does not include radial openings.

The closing elements 90 do not require springs in this embodiment. The respective closing element 90 is thus freely moveable within limits between a valve seat 70 and a stop 80 or 81. Thus, the interior pressure coming from the supply connection P provides that the check valves 104, 105 are closed. The check valves 104, 105 include stops 80, 81 in a direction axially oriented towards the supply connection P. The stops 80, 81 prevent that the closing elements 90 flow axially far enough towards the supply connection P so that closing the check valve 104, 105 would require too much time. The stops 80, 81 extend in radially outward direction from the hollow piston 102. The stops 80, 81 are arranged at a stop sleeve 79 which is slid onto the hollow piston 102 centrally between both check valves 104, 105.

Figure 4:
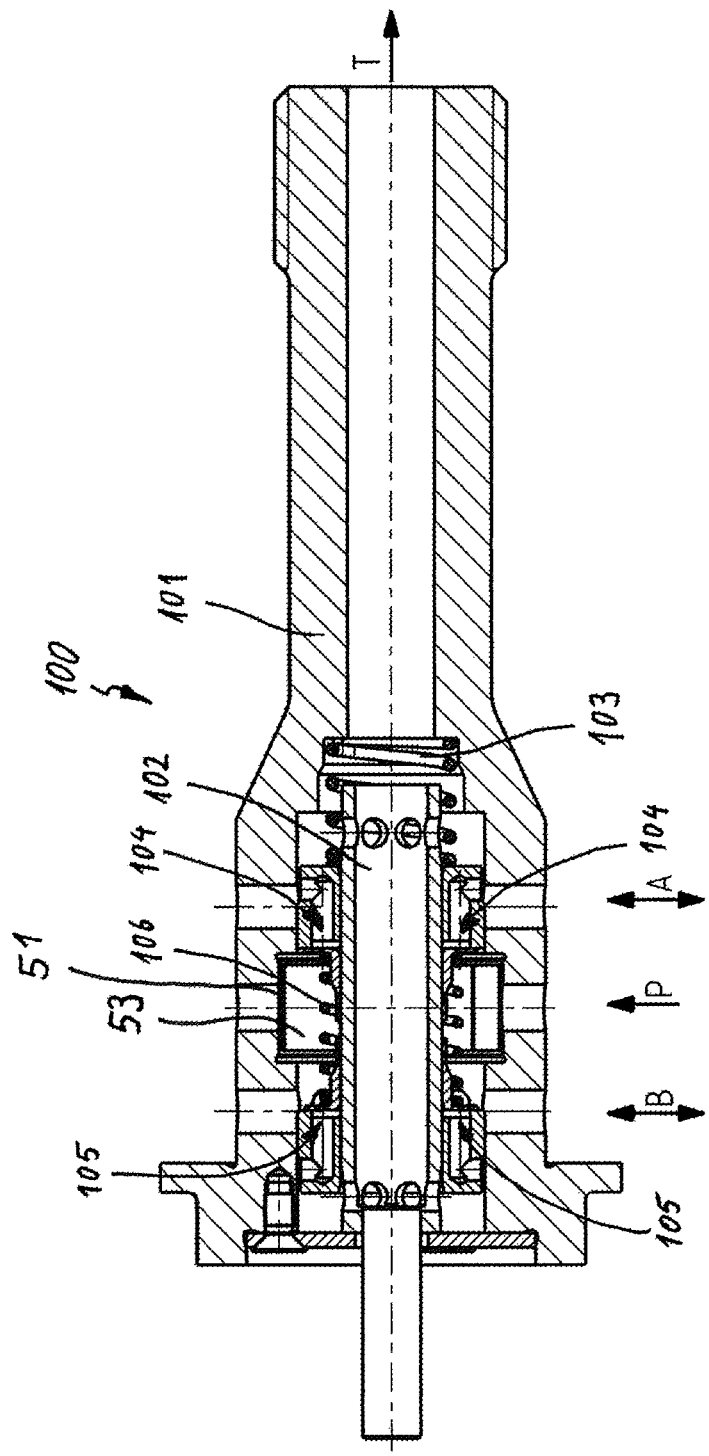
FIG. 4 illustrates a longitudinal sectional view of another embodiment of a central valve.

FIG. 4 illustrates another embodiment of a central valve 100 for a pivot motor actuator. This embodiment differs from the embodiment of FIG. 3 among other things in that the check valves are not ball valves. The first check valves 104 have a common annular closing element in this embodiment. This closing element is moveable in a longitudinal direction of the hollow piston 102 against a force of a compression spring 106 which presses against the closing element with one end. The other end of the compression spring 106 presses against an identically configured closing element of the second check valves 105.

Figure 5:
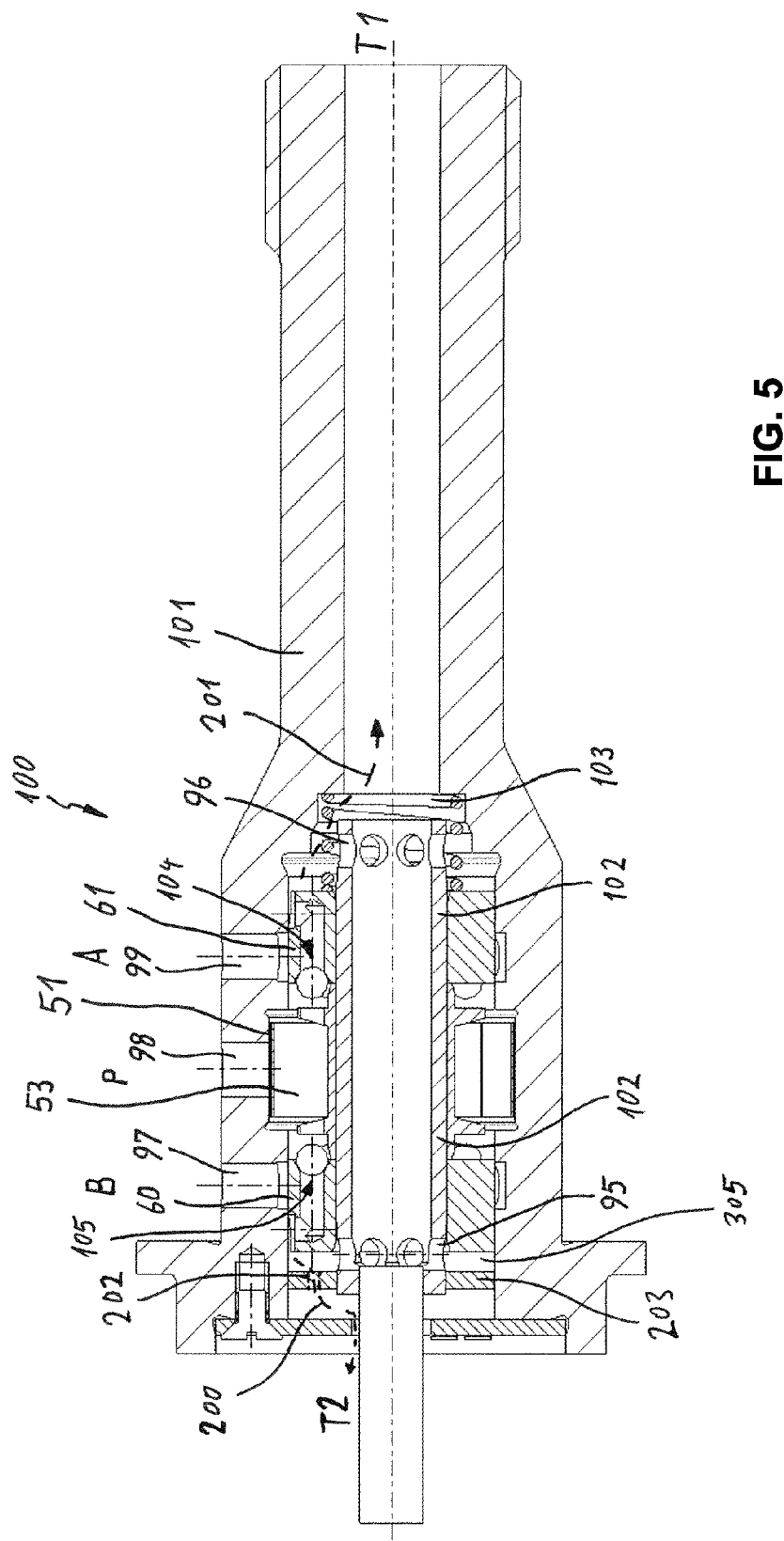
FIG. 5 illustrates a longitudinal sectional view of the central valve according to the first embodiment, wherein one piston is in a center position.
Figure 6:
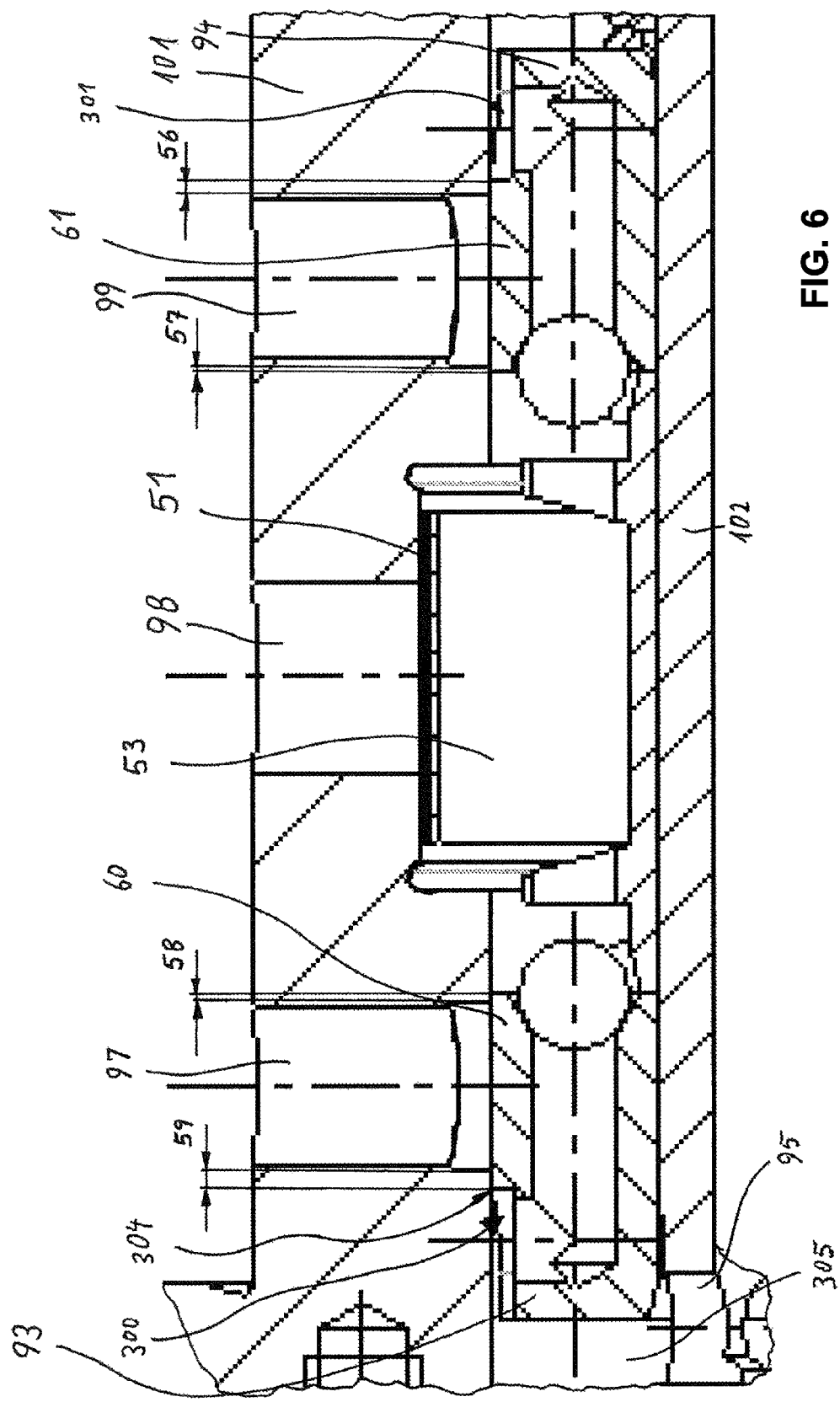
FIG. 6 illustrates a detail of FIG. 5.

FIG. 5 and the detail of FIG. 6 illustrate the hollow piston 102 in the second position for the first embodiment, this means for FIG. 3. This second position of the hollow piston 102 is a center position. In this center position the first operating connection A and the second operating connection B are blocked. Thus, the two annular bars 60, 61 cover the radial recesses 97, 99 with overlaps 59, 58, 57, 56. The overlaps 59, 56 towards the tank drain connection T are greater than the overlaps 58, 57 towards the supply connection P. In the embodiment the overlaps 59, 56 towards the tank drain connection T have twice the size of the overlaps 58, 57 towards the supply connection P. Thus, the overlaps 59, 56 towards the tank drain connection T are approximately 2/10 mm. On the other hand side the overlaps 58, 57 towards the supply connection P are 1/10 mm. Since the hollow piston 102 is axially moveable relative to the housing tube 101 radial clearance is provided at this location as a matter of consequence. Thus, gaps are also provided at the overlaps 59, 58, 57, 56 which facilitate a highly throttled flow of hydraulic fluid. Thus, the throttling increases at the gaps with the length of the overlap, this means with the gap length. The overlaps 59, 56 towards the tank drain connection T are thus large enough so that the throttling is very strong at this location. The small amount of hydraulic fluid which flows during pressure spikes in the pressure cavities at the overlaps 59, 56 through the long gaps flows to the tank drain connection T and cannot open the check valve 104 or 105 from behind. Namely the flow resistances towards the tank drain are very small for volume flows that small. Thus, alternating pressure spikes due to cam adjustment torques in the center position do not cause control problems.

Since the gap lengths towards the supply connection P are relatively short, also the two operating connections A, B are supplied with throttled hydraulic pressure by the supply connection P. Thus, the rotor 8 is hydraulically preloaded relative to the stator 1. In order to provide hydraulic preload in the center position the central valve is provided according to DE 198 23 619 A1 with respect to flow conditions.

FIG. 5 illustrates an alternative embodiment in dashed lines. Thus, hydraulic flows 200, 201 are illustrated. This embodiment makes sense in particular when the radial openings 95, 96 are omitted. Then, the inner cavity of the hollow piston 102 can be used for another oil conducting function. Instead of the hollow piston 102 a piston made from solid material is alternatively provided. From the operating connection A to the first tank drain connection T1 the hydraulic flow 201 is provided at an outside at the hollow piston 102 or along the hollow piston. From the second operating connection B to the second tank drain connection T2 the hydraulic flow 200 is provided externally at the hollow piston 102 or along the hollow piston 102. Thus, a hole 202 is either provided in the disc 203 or the disc 203 is omitted. A second tank drain connection T2 towards an outside is useful in particular when a chain is used for driving the pivot motor actuator which chain has to be lubricated with hydraulic fluid or oil.

In additional embodiments either only the first radial openings 95 or only the second radial openings are omitted.

In all embodiments throttling locations 300, 301 are apparent which are subsequently described with reference to FIG. 3 and FIG. 6 and which are also disclosed in DE 10 2012 11 033.6 that is not prepublished. A throttling location 300 or 301 of this type provides a high level of control quality for the pivot motor camshaft actuator.

An electromagnetic actuator 303 is provided for actuating the hollow piston 102 and illustrated in FIG. 3. Thus, during a reduction of the current at the electromagnetic actuator 303 it is already commenced rather early to run the hydraulic fluid out of the pressure cavity to the tank drain connection T. Furthermore the characteristic curve which represents the volume flow of this drain over electrical extends in a rather linear manner.

As apparent from FIG. 6, the annular bar 60 includes a control edge 304 oriented towards the electromagnetic actuator 303. This forms a space 305 within the housing tube 101 which is defined on the one hand side by the sleeve 93 at the hollow piston 102 and on the other hand side by the disc 203. The hydraulic fluid can be run to the tank drain T from this space 305 through the radial opening 95 or alternatively through the hole 202.

Without the throttling location 300 the pivot motor camshaft actuator, however, for example due to camshaft adjustment torques, may tend to press more hydraulic fluid into the space 305 than can be pressed out of the space 305 through the radial opening 95 or the hole 202. Then it may initially not be possible under a quick decrease of current at the electromagnet to move the hollow piston 102 towards the space 305 that is loaded with a relatively high pressure through the first operating connection A. This means the hollow piston 102 cannot follow the electromagnetic actuator 303 and a gap would open at this location. Since the hollow piston 102 does not move, the flow cross section at the operating connections A, B cannot change either. Therefore the throttling location 300 is provided between the first operating connection A and the space 305. Due to the hydraulic fluid, thus only being resupplied by the operating connection in a small amount the space 305 can be unloaded more quickly through the opening 95 or the hole 202 and the run out to the tank drain connection is performed earlier. The characteristic curve which represents the flow through of this run out over the current thus extends in a more linear manner than without the throttling location 300. This facilitates exact control.

Thus the control edge 304 is provided at the sleeve 93 at its side that is oriented away from the other sleeve 94. The space 305 is defined within the housing tube 101 on the one hand side by the first sleeve 93 and on the other hand side by the disc 202 that is fixated relative to the housing tube. The radial opening 95 or the hole 202 extend from the space 305. This opening 95 or the hole 202 hydraulically connect the space 305 with an outlet channel 310 extending to a tank drain connection T. The throttling location 300 is provided between the control edge 304 and the space 305.

The same situation exists at the throttling location 301, however, the effect is smaller.

What is claimed is:

1. A central valve for a pivot motor actuator, the central valve, comprising:
    a housing tube including a first operating connection, a supply connection, a second operating connection and a tank drain connection,
    wherein a respective radial recess is associated with each of the two operating connections, wherein the respective radial recess is coverable by a respective annular bar of a piston that is arranged within the housing tube and axially moveable relative to the housing tube,
    wherein the first operating connection is connected with the supply connection in a first position of the piston in that a first annular bar opens a first radial recess towards the supply connection,
    wherein the second operating connection is opened by a second annular bar towards the tank drain connection in the first position of the piston,
    wherein the piston is in a center position in a second position of the piston,
    wherein the second operating connection is connected with the supply connection in a third position of the piston in that the second annular bar opens the second radial recess towards the supply connection,
    wherein the first operating connection is opened by the first annular bar towards the tank drain connection in the third position of the piston,
    wherein the piston includes at least one first check valve on its outside wherein the at least one first check valve opens a flow path from the first operating connection to the second operating connection when the piston is in the third position and a pressure is provided at the first operating connection that exceeds a first threshold value and the piston includes at least one second check valve on its outside wherein the at least one second check valve opens a flow path from the second operating connection to the first operating connection when the piston is in the first position and a pressure is provided at the second operating connection which exceeds a second threshold value,
    wherein both radial recesses are covered by the annular bars towards the tank drain connection by overlaps in the center position of the piston, so that pressure spikes above the threshold values from the operating connections to the check valves are highly throttled.

2. The central valve according to claim 1, wherein the piston is a hollow piston.

3. The central valve according to claim 2, wherein the hollow piston includes radial openings for the tank drain connection.

4. The central valve according to claim 1, wherein the at least one first check valve and the at least one second check valve is arranged at a first sleeve which envelops the piston.

5. The central valve according to claim 4,
    wherein a control edge is provided at least at one sleeve of the first sleeve and a second sleeve on a side of the at least one sleeve which side is oriented away from the other of the first sleeve and the second sleeve,
    wherein a space within the housing tube is defined on the one hand side by the at least one sleeve and on the other hand side by an element that is fixated relative to the housing tube,
    wherein a radial opening extends from the space which radial opening hydraulically connects the space with an outlet channel leading to the tank drain connection,
    wherein a throttling location is provided between the control edge and the space.

6. The central valve according to claim 1, wherein both radial recesses are covered by the annular bars towards the supply connection by overlaps in the center position of the piston so that a rotor of a pivot motor actuator is hydraulically preloaded relative to a stator of the pivot motor actuator.

7. The central valve according to claim 1,
    wherein a pump check valve is arranged downstream of the supply connection,
    wherein a cavity is arranged downstream of the pump check valve and the cavity is arranged in a flow path between the first operating connection and the second operating connection.

8. The central valve according to claim 1, wherein the check valves are configured as ball check valves.

* * * * *